(12) United States Patent
Imano

(10) Patent No.: US 6,572,283 B1
(45) Date of Patent: Jun. 3, 2003

(54) CAMERA DRIVE DEVICE

(75) Inventor: Seiichi Imano, Chiba-ken (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 09/689,091

(22) Filed: Oct. 12, 2000

(30) Foreign Application Priority Data

Oct. 18, 1999 (JP) .......................................... 11-295664

(51) Int. Cl.$^7$ ................................................ G03B 9/08
(52) U.S. Cl. ........................ 396/463; 396/489; 310/254
(58) Field of Search .............................. 310/216, 49 R, 310/254; 396/489, 411, 463

(56) References Cited

U.S. PATENT DOCUMENTS 4,806,813 A * 2/1989 Sumi et al. .................. 310/254

* cited by examiner

*Primary Examiner*—David Gray
(74) *Attorney, Agent, or Firm*—Jordan and Hamburg LLP

(57) ABSTRACT

A planar space required for installing a camera drive device is reduced. Provided are a rotor magnetized in a radial direction, a pair of stator magnetic pole plates radially opposed to the rotor, yokes formed by extension portions extending radially of the rotor and rise-bent portion vertically raised and bent from extension portions and reaching the stator magnetic pole plates, and a coil provided on the yokes. Each member is arranged in a spatial fashion instead of a planar fashion.

8 Claims, 4 Drawing Sheets

CAMERA DRIVE DEVICE

BACKGROUND OF THE INVENTION

1. Field of the Invention

The present invention relates to camera drive devices and, more particularly, to a drive device used in operating an objective lens, a shutter sector, aperture blades or the like

2. Description of the Prior Art

In recent years, the camera-drive devices have been broadly utilized to rotate a rotor magnetized with multiple poles by energizing a single coil wound around a stator, because of no requirement for mechanical charge mechanisms. Particularly, such drive devices are effective together with the requirement of size reduction of the drive device as the cameras are made more compact. FIG. 6 shows a conventional drive device, wherein a rotor R radially magnetized with a multiplicity of poles arranged at a location sandwiched between opposite ends S1, S2 of a stator S is rotated around a center axis 22 by energizing a coil L wound around the stator. By the rotation of the rotor R, a sector lever 20 provided on a common axis to the rotor R is structurally operated to operate sectors 23, 24 through a pin 20a provided on the sector lever 20, thereby opening and closing the shutter aperture 2. That is, the rotor R, the stator S and the coil L are arranged on the common plane, which occupies around the shutter aperture 2 a planar area of schematically shown at an angle θ in the figure.

However, the conventional drive device if arranged nearby a camera lens barrel needs much planar space because of the arrangement on the common plane of the stator, coil and rotor, resulting in a problem with difficulty in reducing the size of the drive device.

SUMMARY OF THE INVENTION

In order to solve the above problem, the present invention is provided with yokes formed by extension portions extending in the radial direction of the rotor and rise-bent portions vertically rise-bent from both ends of the extension portions to reach the stator magnetic pole plates, thereby enabling spatial arrangement for the camera drive device.

A structure is provided such that a motor for driving a camera operating member is structured by a permanent magnet rotor magnetized in a radial direction, a stator for driving the rotor and a coil for exciting the stator; the stator being formed by a pair of stator magnetic plates opposed in a radial direction to the rotor and yokes partly wound around by the coil and for inducing a magnetic flux on the coil to both of the stator magnetic pole plates; and the yokes being formed by extension portions extending in the radial direction of the rotor in a position axially opposed to the rotor and rise-bent portions vertically rise-bent from both ends of the extension portions to reach the stator magnetic pole plates.

Also, the both stator magnetic pole plates may be made in a one body structure through magnetically-separated narrowed portions. Also, the coil may be wound around on the rise-bent portion or the extension portion.

DETAILED DESCRIPTION OF THE PREFERRED EMBODIMENTS

Figure 1:
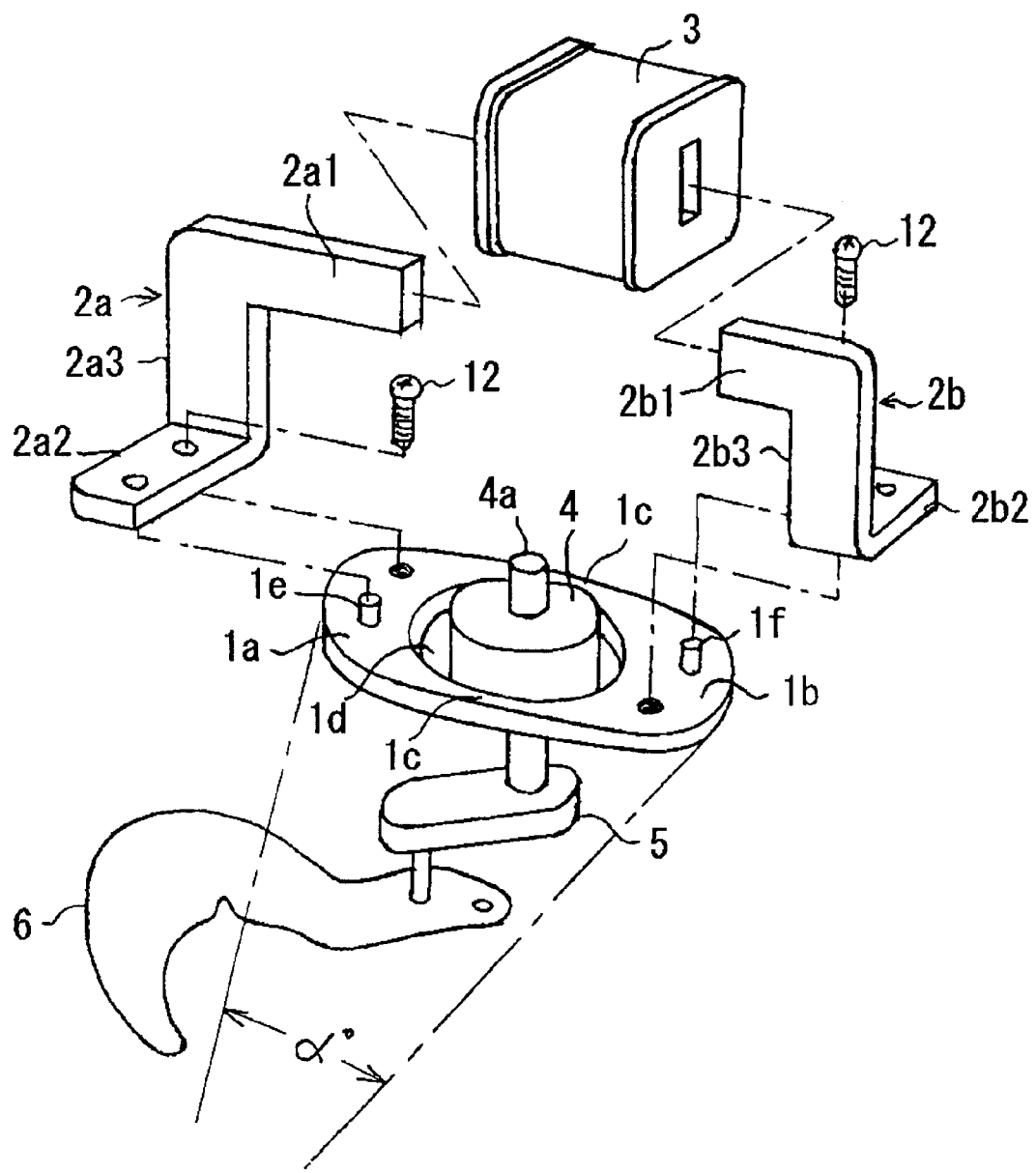
FIG. 1 is an explanatory view of one embodiment of the present invention.

A drive device according to the present invention will be explained with reference to the drawings. As shown in FIG. 1, a pair of stator magnetic pole plates 1a, 1b formed of a magnetic material are fixed on a not-shown shutter base plate by the known method. The stator magnetic pole plates 1a, 1b are made in one body through narrowed portions 1c to have a plate member having a hole 1d at a center. The narrowed portion 1c is reduced in sectional area and easy for magnetic saturation. Although mechanically an integral structure, magnetically the stator magnetic pole plates 1a, 1b are separated into two so that different poles can be generated on the stator magnetic pole plates 1a, 1b. A permanent magnet rotor 4 is radially magnetized and inserted in the hole 1d formed by the stator magnetic pole plates 1a, 1b and narrowed portion 1c. On the shutter base plate, a rotor shaft 4a is rotatably attached.

Figure 3:
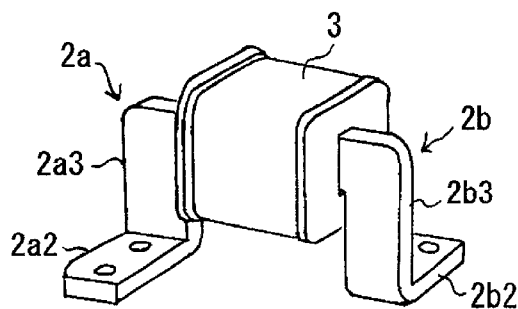
FIG. 3 is a fragmentary view of the one embodiment of the invention.

Yokes 2a, 2b are formed of a magnetic material likewise the stator magnetic pole plates 1a, 1b. The yoke 2a is provided with an attaching portion 2a2 so that the yoke 2a is fixed on the stator magnetic pole plate 1a by a positioning projection 1e and screw 12. Similarly, the yoke 2b is fixed on the stator magnetic pole plate 1b through an attaching portion 2b2. The yoke 2a has an extension portion 2a1 extending in a radial direction of the rotor 4 in a position opposed to the rotor in its radial direction (in the upper of the figure) and a rise-bent portion 2a3 vertically rising and bent from one end of the extension portion 2a1 to reach the stator magnetic pole plate 1a. Similarly, the yoke 2b has an extension portion 2b1 extending radially of the rotor 4 and a rise-bent portion 2b3. A coil 3 is provided on the extension portions 2a1, 2b1, By flowing electric current, magnetic poles are generated on the stator magnetic pole plates 1a, 1b. A coil 3 if provided on the yoke 2a, 2b provides a state as shown in FIG. 3.

Consequently, the coil 3 is arranged above the rotor 4 instead of a plane thereof. The rotor shaft 4a is fixed at a lower end with a sector lever 5 and coupled to a sector 6 as well as to another sector. Accordingly, when the coil 3 is energized, S or N pole is generated on the stator magnetic pole plate 1a, 1b to rotate the rotor 4. The selector lever 5 provided on the rotor shaft 4 is swung to open the sector 6. Elapsing a desired time, the coil 3 is reverse energized to rotate reverse the rotor 4, closing the sector 6 and completing exposure. Because of a drive device thus structured, this drive device in planar space (area required for installation) is accommodated within a range shown at an angle α on the figure. Planar setup space is made smaller than the conventional drive device.

Figure 2:
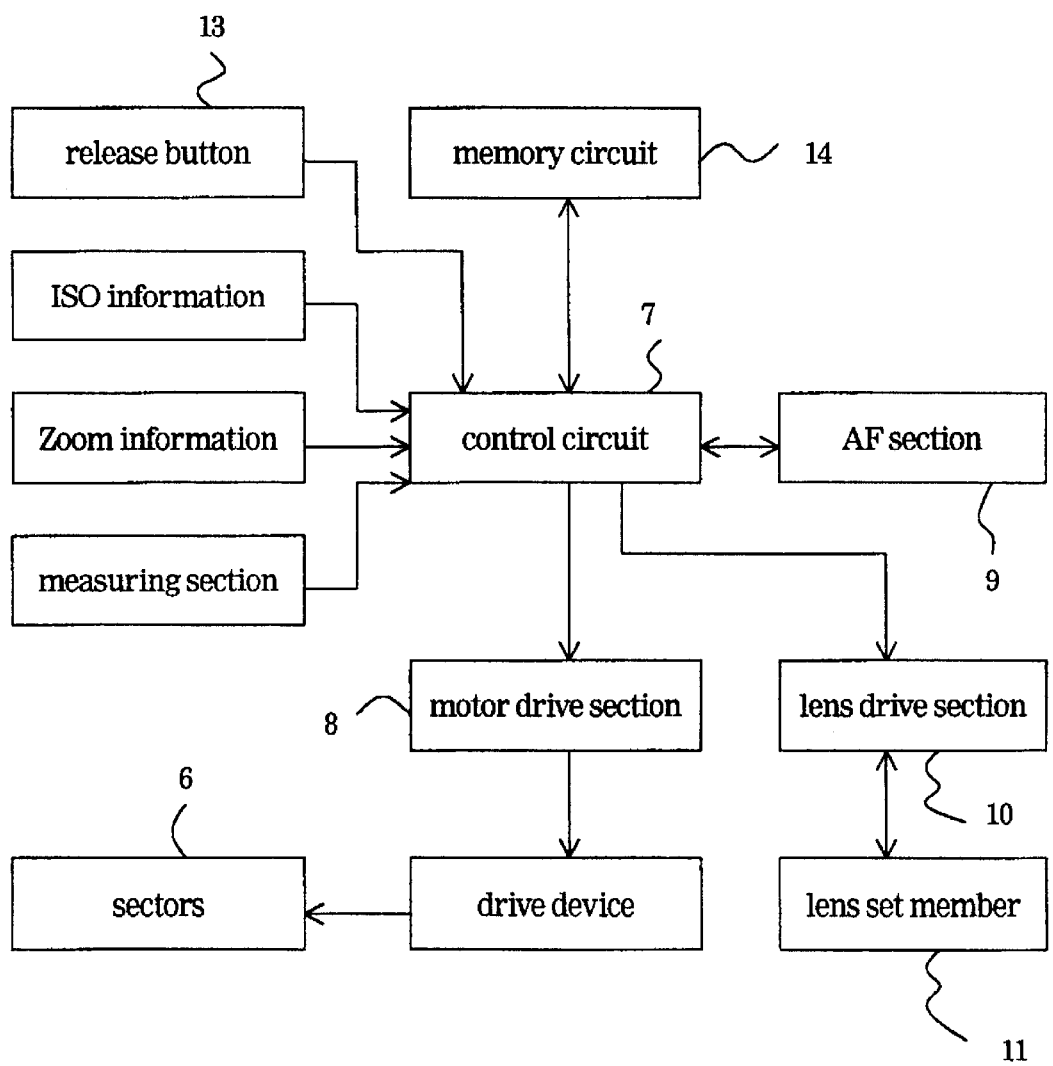
FIG. 2 is a block diagram showing a camera control system used in the embodiment of the invention.

FIG. 2 is a block diagram showing a known camera control system. Explaining the outline, when a picture-taking release button 13 is operated, a control circuit 7 calls out of a memory circuit 14 control data depending on a brightness of a subject as measured by a measuring section correspondingly to ISO information representative of a film sensitivity, zoom information concerning an objective lens and so on. Simultaneously, an AF section 9 measures a distance to the subject and calls control data out of the memory circuit 14. The control circuit 7 outputs these of control data to a motor drive section 8 and lens drive section 10.

First, the lens drive section 10 energizes the coil as a lens set member 11 for a predetermined time to rotate the rotor on the basis of control data, moving the objective lens to a desired position. Then, a motor drive section 8 energizes the coil 3 for a predetermined time based upon the control data to rotate the rotor 4, release-operating the sector 6 by the sector lever 5. When a proper exposure is reached, the rotor 4 rotates reverse to close-operate the sector 6.

Figure 4:
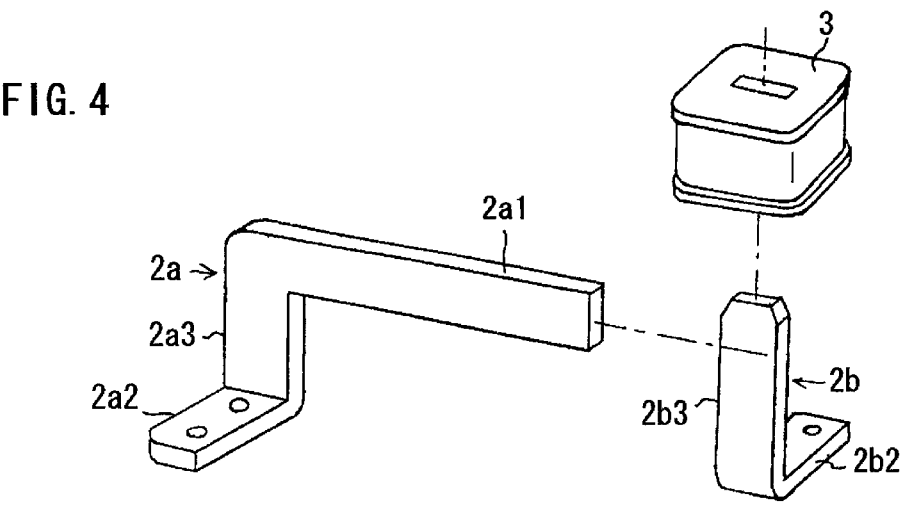
FIG. 4 is a fragmentary view of another embodiment of the invention.

FIG. 4 depict that, in a second embodiment of the invention, the yoke 2a at the extension portion 2a1 is extended to omit the extension portion from the yoke 2b thereby providing the coil on the rise-bent portion 2b3 of the yoke 2b. This is effective when the coil cannot be provided immediately above the rotor for the sake of convenience in design. Even with this structure, the planar setup space can be made smaller than the conventional.

Figure 5:
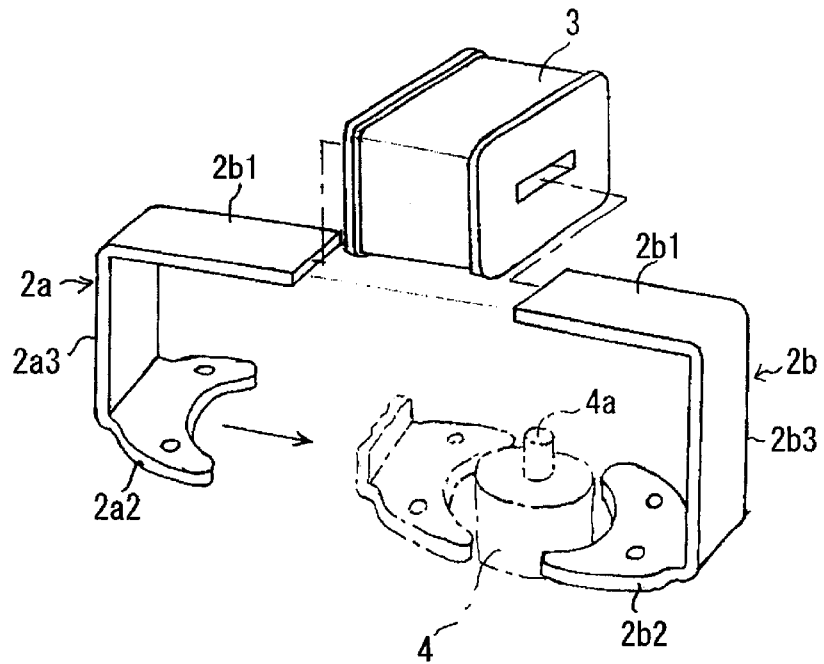
FIG. 5 is a fragmentary view of another embodiment of the invention.
Figure 6:
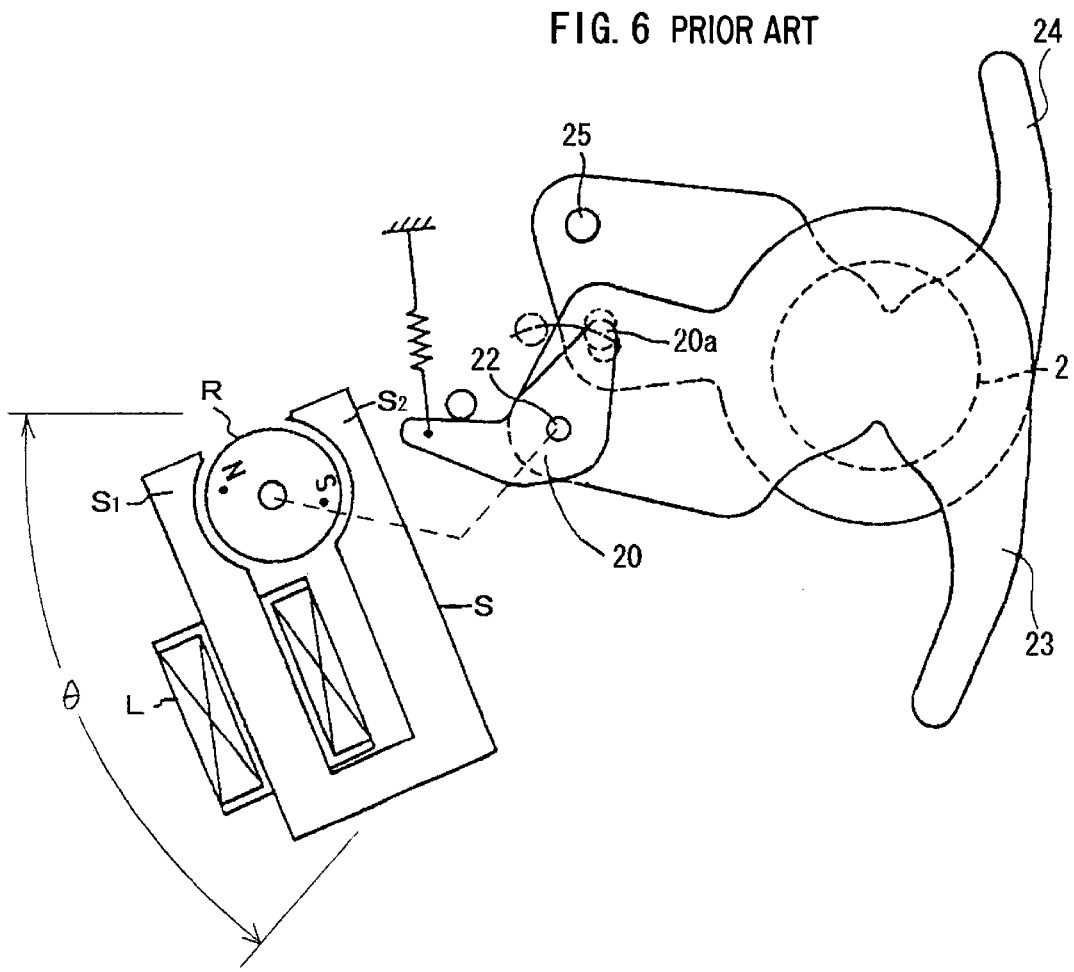
FIG. 6 is a plane view of a conventional example.

FIG. 5 depicts that, in a third embodiment of the invention, the stator magnetic pole plates and the yoke are made in an integral structure. The yoke 2a is provided with an extension portion 2a1, a rise-bent portion 2a3 and an attaching portion 2a2. Unlike the first embodiment, the attaching portion 2a2 serves also as a stator magnetic pole plate. Consequently, the attaching portion 2a2 has a magnetic portion 2a4 formed arcuate along an outer peripheral surface of the rotor 4. The magnetic portion 2a4 is provided in a position opposed to the rotor 4 in its radial direction. Likewise, a yoke 2b is also structured. The stator magnetic pole part and the yoke are made in an integral structure hence improving assembling efficiency.

The effect is available similarly even when the yoke is formed as one part without division as in the first to third embodiments to wind a coil around this yoke.

The drive device of the invention is usable as an aperture device or lens-drive device because the rotation angle of the rotor 4 can be controlled by an amount of current energized to the coil 3.

Incidentally, the drive device of the invention is not limited to the above embodiments but applicable as other drive devices through proper modification within the spirit of the present invention The drive device of the invention can reduce the planar setup area for the drive device. Accordingly, when provided nearby the lens barrel, no obstruction is encountered to other mechanisms thus making it possible further to reduce the planar space of the lens barrel area.

What is claimed is:

1. A camera drive device comprising:
   a motor for driving a camera operating member, said motor including a permanent magnet rotor magnetized in a radial direction, a stator for driving the rotor and a coil for exciting the stator;
   the stator being formed by a pair of stator magnetic plates opposed in a radial direction to the rotor and yokes, said coil being partly wound around said yokes for inducing a magnetic flux on the coil to both of the stator magnetic pole plates, and
   the yokes being formed by extension portions extending in the radial direction of the rotor in a position axially opposed to and spaced from one axial end of the rotor and rise-bent portions vertically rise-bent from both ends of the extension portions to reach the stator magnetic pole plates.

2. A camera drive device according to claim 1, wherein the both stator magnetic pole plates are made in a one body structure through magnetically-separated narrowed portions.

3. A camera drive device according to claim 1, wherein the coil is wound around on the extension portion.

4. A camera drive device according to claim 1, wherein the coil is sound around said rise-bent portion.

5. A camera drive device according to claim 1, wherein said coil is disposed in overlying relationship with the axial end of the rotor.

6. A camera drive device according to claim 1, wherein said rotor has a rotor shaft, said extension portion extending over one axial end of the rotor shaft.

7. A camera drive device according to claim 1, wherein said yoke has a generally U-shaped configuration.

8. A camera drive device comprising:
   a motor structure for driving a camera operating member, said motor structure comprising a permanent magnet rotor magnetized in a radial direction, a stator for driving the rotor and a coil for exciting the stator;
   said stator comprising yokes and a pair of stator magnetic pole plates opposed in a radial direction to the rotor, said coil being partly wound around said yokes for inducing a magnetic flux on the coil to both of the stator magnetic pole plates; and
   said yokes further comprising rise-bent portions extending upright from the stator magnetic pole plates and extension portions extending from said rise-bent portions in the radial direction of the rotor in a position axially opposed to and spaced from one axial end of the rotor.

* * * * *